Patented Sept. 12, 1939

2,172,752

UNITED STATES PATENT OFFICE

2,172,752
AZO DYES

Donovan E. Kvalnes, Carneys Point, N. J., assignor to E. I. du Pont de Nemours & Company, Wilmington, Del., a corporation of Delaware No Drawing. Application July 14, 1937,
Serial No. 153,518

7 Claims. (Cl. 260—205)

This invention relates to the dyeing of materials composed of or containing cellulose esters and ethers and especially to the dyeing of such materials with certain amino azo compounds, to the development of such compounds with beta-oxy-naphthoic acid to give shades of blue and black of superior fastness, to textile materials dyed with the dyes, and to processes of making the dyes.

Heretofore black dyeings on cellulose acetate have been obtained by diazotization on the fiber of a direct dyeing of certain amino azo compounds and developing with beta-oxy-naphthoic acid under slightly acid conditions. Examples of such amino azo compounds are 4'-amino-4-(dimethyl amino) azo benzene, 4'-amino benzene azo-4-amino naphthalene and 4'-amino, 2'-chloro, 4(dimethyl amino) azo benzene. There have also been used compounds represented by the formula

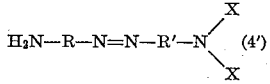

wherein R represents a phenyl radical substituted or not by halogen, alkyl or alkoxyl, R' a phenyl or naphthyl radical substituted or not by halogen or alkyl, and X stands for methyl, ethyl, or hydroxy ethyl. These compounds were diazotized on the fiber and developed with 2-hydroxy naphthalene-3-carboxylic acid. In the latter compounds the two groups on the tertiary amino nitrogen are alike, such as two methyl groups or two hydroxy ethyl groups. These dyes were satisfactory in many respects but they were not entirely satisfactory from the standpoint of bleeding. When subjected to steam, heat or severe washing they stained undyed cellulose acetate to an undesirable extent, and it was desirable to provide dyes which do not have these defects.

An object of this invention is to provide dyeings of black shades on materials of cellulose esters and ethers, such as cellulose acetate which have superior fastness and non-bleeding properties such that they will not impart stain on adjacent undyed materials of the kind when subjected to steam, heat or severe washing. Another object is to provide intermediates for producing the dyeings and processes for making the same. Other objects will be apparent from the following description.

The objects of the invention are attained in general by dyeing a cellulose acetate textile material with an amino azo compound which is represented by the formula

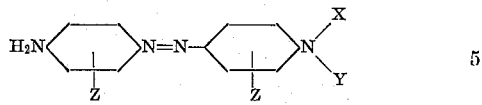

in which X is alkyl, Y is hydroxy alkyl and Z is one of the group consisting of hydrogen, halogen, alkyl and alkoxy. The compound is diazotized on the fiber and coupled with beta-oxy-naphthoic acid by warming in a medium in which the pH is less than 7.1.

The invention is illustrated but not limited by the following examples.

Example I

4'-amino-4-(ethyl, hydroxy ethyl amino) azo benzene was prepared in the following manner. The compound 4'-nitro-4-(ethyl, hydroxy ethyl amino) azo benzene was prepared by coupling diazotized para nitro aniline to ethyl, hydroxy ethyl aniline by methods well known in the art. The nitro substituted compound was reduced by warming an aqueous suspension thereof to 80° C. with one and one-half moles of sodium sulfide. When reduction was complete the reaction mixture was cooled to room temperature and filtered, and the residue was washed and dried. The product was purified by dissolving the product in a dilute non-oxidizing acid at 45° C., filtering, cooling the filtrate and neutralizing the acid with caustic soda.

The compound is represented by the formula

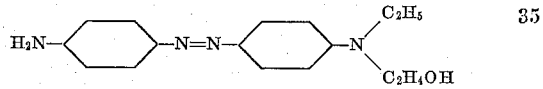

A cellulose actate fabrics was dyed with the compound in a bath heated to 160° F. The substantivity was good whereas 4'-amino-4-dimethyl amino-azo benzene has relatively poor substantivity for this material at this temperature. The dye was diazotized on the fiber and coupled with beta-oxy-naphthoic acid in slightly acid medium at 150° F. The developed dye was a bright black shade. The developed dye is represented by the formula

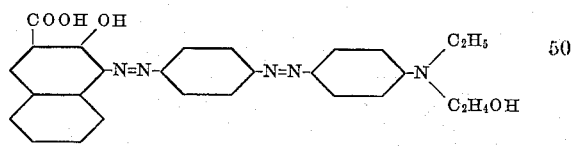

The dyed material was superior to the similarly developed dyes from 4'-amino-4-dimethyl amino-azo benzene or from 4'-amino benzene azo-4-amino naphthalene with respect to sublimation and staining.

*Example II*

The same base was prepared in the following manner. 180 parts of oxalyl para phenylene diamine are dissolved in 2500 parts of water and 110 parts of 28.5% ammonia solution. The solution was cooled to 0°–5° C. by the addition of ice and 69 parts of sodium nitrite were added. This solution was stirred into a mixture of 1000 parts of water and 360 parts of a 31.5% hydrochloric acid solution cooled with ice to 0°–5° C. When diazotization was complete a solution of 165 parts of ethyl, hydroxy ethyl aniline in 1000 parts of water and 100 parts of a 31.5% hydrochloric acid solution were added to the diazo. 340 parts of sodium acetate hydrate were added, followed by the slow addition of a dilute solution containing 100 parts of sodium hydroxide. Coupling was complete in about two hours and the temperature was 15° to 20° C. Enough sodium hydroxide was added to give a 5% solution and the temperature was raised to 90° C. and held there until hydrolysis was complete. This required three to four hours. The reaction mixture was filtered at 20° C. and the residue washed with sufficient cold water to free it from alkali. The weight of the dry product was 255, corresponding to a yield of 90%. This compound is the same as the intermediate produced in accordance with the process of Example I and gave the same dye when developed with beta-oxy-naphthoic acid.

*Example III*

An equivalent of 4-nitro-2-chlor-aniline instead of para nitro-aniline was used in accordance with the procedure of Example I and 4'-amino-2'-chloro-. 4(ethyl, hydroxy ethyl amino) azo benzene which is represented by the following formula was prepared.

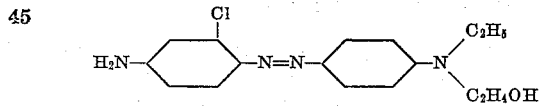

This compound was dyed on cellulose acetate and developed in the manner described in Example I. The substantivity, and lack of sublimation and staining compared favorably with the products of Example I. The developed dye is represented by the formula

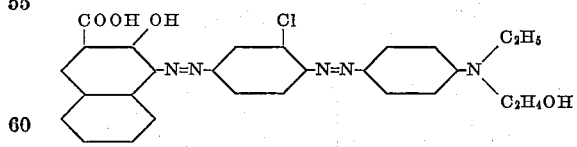

*Example IV*

In a similar manner 4'-amino-4-(ethyl, hydroxy ethyl) amino-2-methyl azo benzene was prepared by coupling diazotized para nitro aniline to (ethyl, hydroxy ethyl) meta toluidine. This compound having the desirable properties of the products of Example I is represented by the formula

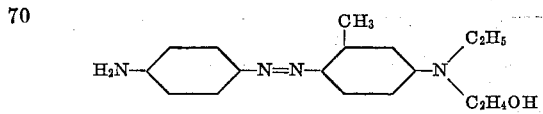

Dyed on cellulose acetate and similarly developed, the developed dye had the superior properties of the developed dye of Example I. The developed dye is represented by the formula

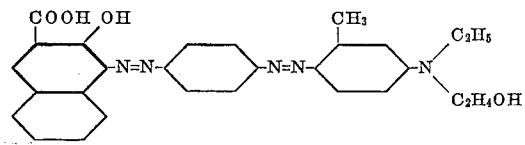

It was found that in general the amino azo compounds described in the examples gave better exhaust values in dye baths at 190° F. than other compounds differing only with respect to the end group which was $-N(C_2H_4OH)_2$ Other compounds found to have improved exhaust properties, good substantivity to cellulose esters and yielding improved black shades upon development are represented by the general formula

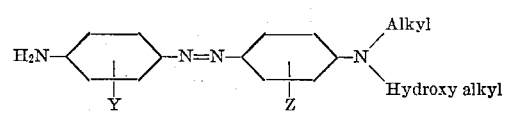

in which Y is hydrogen, alkyl, alkoxy or halogen and Z is hydrogen, alkyl, alkoxy or halogen. Alkyl groups having one or more carbon atoms, such as methyl, ethyl, propyl, butyl and the corresponding alkoxy groups can be used. The hydroxy alkyl group may contain two or more carbons. Any of the halogens can be used.

Instead of using oxalyl para phenylene diamine as the starting compound and afterwards hydrolyzing the acylamino group as described in Example II, any acylamino group can be substituted in the para position of such a starting compound, such as acetyl amino, propionyl amino, butyrl amino and benzoyl amino. Accordingly, the azo combinations which are first produced are represented by the general formula

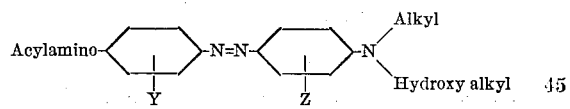

in which Y, Z, alkyl and hydroxy alkyl are the same as the corresponding groups in the general formula hereinbefore defined.

In general, the developed dyes of the invention have the improved non-staining characteristic when the dyed material is subjected to steam, heat alone or severe washing. The intermediate azo combinations have superior affinity for cellulose esters, such as cellulose acetate textiles and good dischargeability, even at temperatures as low as 160° F. Consequently, it is unnecessary to heat the dye baths containing these compounds to such temperatures as 190° F. which are the temperatures commonly used for dyeing cellulose esters. The dyestuffs enable the dyer to employ dyebaths which are below the temperatures that deleteriously affect fabrics and fibres composed of cellulose esters. An advantageous characteristic of the dyestuffs of the invention resides in the strength of the baths at relatively low temperatures in that there is only a slight difference in strength at 160° F. as compared to the strength at 190° F.

It is apparent that variations in the substituents and in the processes will produce corresponding variations in the products. As many such variations which will be suggested to those skilled in the art can be made without departing from the spirit and scope of the invention, it will be understood that the invention is not restricted to the illustrative embodiments which are specifically set forth.

I claim:

1. A compound represented by the formula

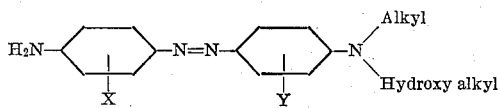

in which X and Y are each at least one of a group consisting of hydrogen, alkyl, alkoxy and halogen, and hydroxy alkyl contains at least two carbon atoms.

2. A compound represented by the formula

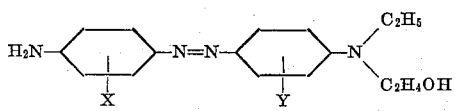

in which X and Y are each one of the group consisting of hydrogen, alkyl, alkoxy and halogen.

3. A compound represented by the formula

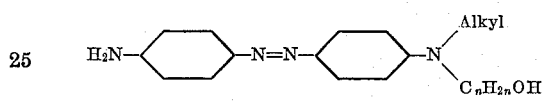

in which $n$ is at least 2.

4. The compound represented by the formula

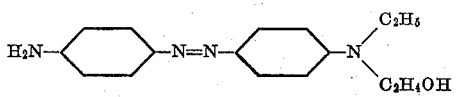

5. The compound represented by the formula

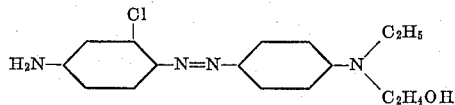

6. The compound represented by the formula

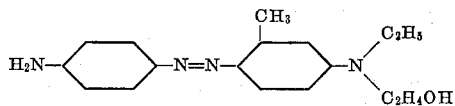

7. The process which comprises coupling an (alkyl, hydroxy alkyl)-amino aryl compound in which aryl is one of the group consisting of benzene and naphthalene to a diazotized compound represented by the formula

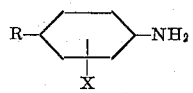

in which R is one of the group consisting of nitro and an acylamino group, and X is at least one of the group consisting of hydrogen, alkyl, alkoxy and halogen; and transforming the R group of the product of coupling to form a 4'-amino-4-(alkyl, hydroxy alkyl) amino azo aryl derivative.

DONOVAN E. KVALNES.